United States Patent

Gerath

[15] 3,639,724
[45] Feb. 1, 1972

[54] WELDING THORIA DISPERSED NICKEL

[72] Inventor: Francis C. Gerath, Canton, Conn.

[73] Assignee: United Aircraft Corporation, East Hartford, Conn.

[22] Filed: June 2, 1970

[21] Appl. No.: 42,638

[52] U.S. Cl. .................................. 219/137, 219/75, 1/145
[51] Int. Cl. ................................................. B23k 9/00
[58] Field of Search .............. 219/137, 145, 75, 130; 75/171; 148/11.5

[56] References Cited

UNITED STATES PATENTS 3,227,849   1/1966   Thielsch ............................. 219/137
3,388,010   6/1968   Stuart ................................ 148/11.5

*Primary Examiner*—R. F. Staubly
*Assistant Examiner*—J. G. Smith
*Attorney*—Charles A. Warren

[57] ABSTRACT

Sheets of thoria dispersed nickel are joined by a filler material consisting of a solid solution hardened alloy using inert gas arc welding techniques. The filler material is sized to provide the desired weld bead configuration and to maintain a sufficient separation between the sheet edges during joining to allow continuous welds of indefinite length; additionally the filler material is compatible with subsequent thermal processing of the sheets during the application of a chromium outer coating. The final coated assemblies have strong welds, free of porosity, and agglomeration of thoria is also avoided.

12 Claims, 3 Drawing Figures

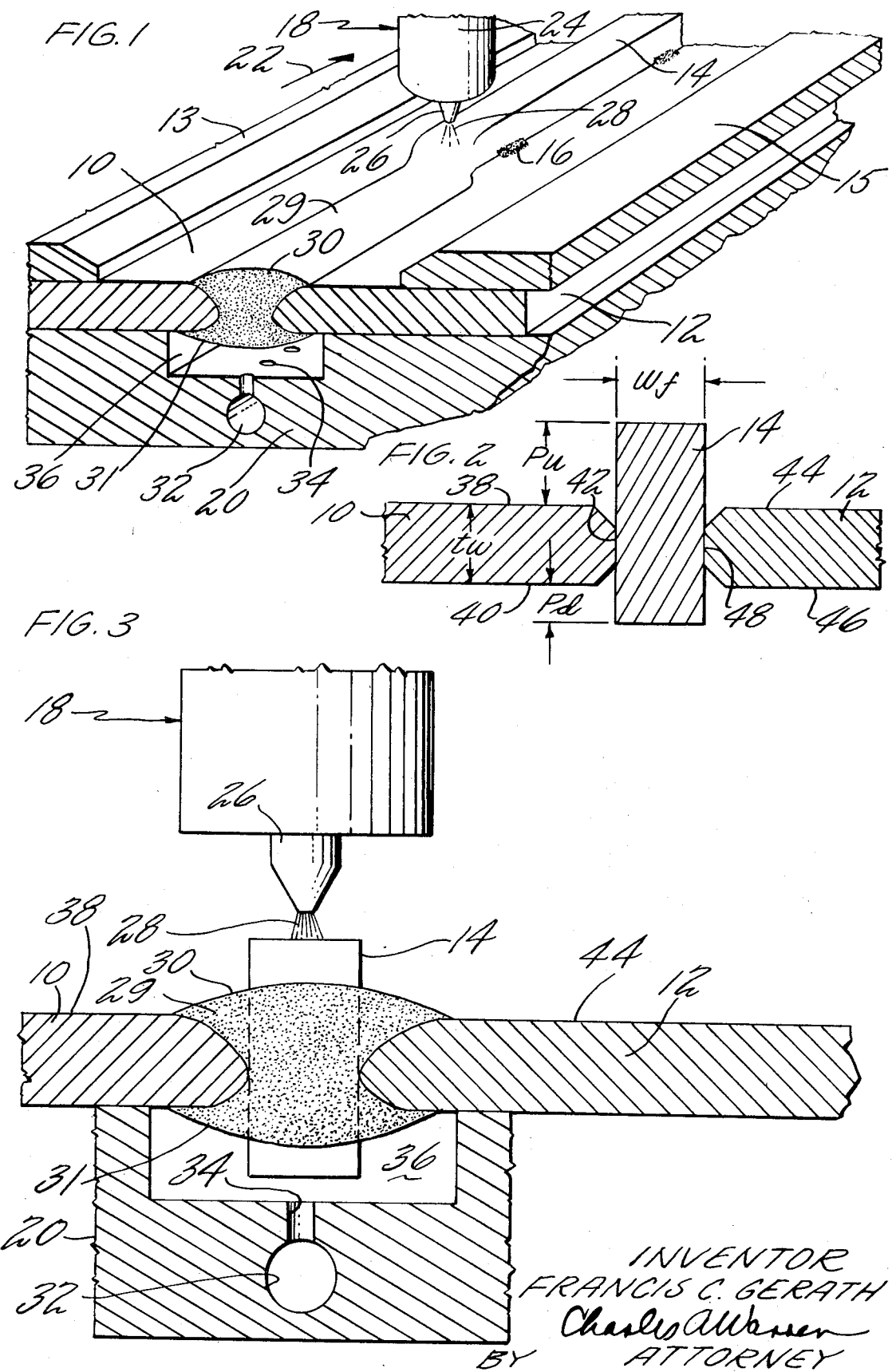

WELDING THORIA DISPERSED NICKEL

BACKGROUND OF THE INVENTION

1. Field of the Invention

This invention relates to the fabrication of articles from components consisting of thoria dispersed nickel and more particularly to the joining by welding of sheets of thoria dispersed nickel.

2. Description of the Prior Art

Metallurgists are continually in search of new materials which could be useful in high-temperature environments. Nickel base and cobalt base alloys are among the better materials currently used in high-temperature applications up to about 1,800° F. The next generation of materials useful at high temperature is considered to be precipitation and dispersion strengthened alloys which are expected to extend the allowable operating temperature range of metals to about 2,100° F. One of these materials is thoria (thorium oxide) dispersed nickel (hereinafter referred to as TD nickel).

One of the major drawbacks to the use of TD nickel is the inherent difficulty in the joining of this material. Conventional electric resistance welding has been attempted, however, the TD nickel has such a high electrical conductivity that the weld puddle or molten zone is not formed at the interface between the pieces to be joined and unsatisfactory joining results. Coating the surface of the pieces to be joined with a higher resistance metal such as chromium prior to the weld operation is a partial solution to the problem; the chromium introduces sufficient electrical resistance at the joint to induce melting and welding of the metal parts. Although resistance welding of TD nickel to itself is possible with a proper precoating, the weld regions are characteristically porous and display crack prone chromium rich zones (due to segregation of the chromium while the metal is molten) in the transition zone between the parent metal and the weld seam. The porosity and agglomeration caused a weakened joint which is unacceptable for use in specific high-temperature gas turbine applications.

Tungsten inert gas (TIG) butt welding has been attempted, however, unacceptable overmelting of the parent metal on the side of the joint away from the tungsten electrode occurred resulting in agglomeration of the thoria and porosity in the weld seam similar to that found in resistance welds. In an attempt to avoid the overmelt condition while using the TIG method, TD nickel has been welded with the pieces to be joined initially spaced apart to allow better penetration of the heating arc, and filler wire was fed into the weld as necessary. This technique is adequate only for welds which are less than approximately 3 inches in length. If a weld seam longer than 3 inches is attempted, the pieces being joined are pulled together and buckle due to the compression forces caused by shrinking action during the weld; shrinkage during butt welding is generally present, however, the problem is especially severe in the case of TD nickel.

SUMMARY OF THE INVENTION

A principal object of the present invention is to join components of thoria dispersed nickel by a high-quality weld of any length while avoiding porosity in the weld region and agglomeration of thoria in the region between the weld seam and the parent metal.

According to the present invention, a spacer strip of solid solution hardened material is tack welded into position between two component pieces of TD nickel to be joined forming a minimum spacing therebetween, and the components pass through a tungsten inert gas electric arc welding apparatus causing the spacer to melt and weld said components into an assembly, the condition of the molten metal maintained to avoid overmelting of the TD nickel and in turn prevent the weld region from developing unacceptable porosity and agglomeration.

According to the techniques of this invention, a minimum gap is maintained between component pieces during a weld by use of spacer strip thereby producing a more ductile and high-strength assembly free of buckling due to shrinkage. Also this invention provides for the maintenance of a gap between the pieces of TD nickel being joined for an indefinite length of weld. Further, by appropriate settings of welding power and weld speed, overmelting of the parent metal, and agglomeration of thoria are minimized and maintained within acceptable tolerances; porosity in the weld bead is eliminated completely.

The foregoing and other objects, features and advantages of the present invention will become more apparent in the light of the following detailed description of preferred embodiments thereof as illustrated in the accompanying drawings.

BRIEF DESCRIPTION OF THE DRAWINGS

FIG. 1 is a schematized prospective of the weld operation in accordance with the present invention;

FIG. 2 is a schematic front elevation of two component pieces to be welded with a filler spacer in position;

FIG. 3 is a schematized cross section of a weld section positioned in a tungsten inert gas welding arrangement.

DESCRIPTION OF THE PREFERRED EMBODIMENT

An acceptable welding of thoria dispersed nickel can be accomplished with the tungsten inert gas method if the rate of application of electrical power, the materials and materials preparation, the weld speeds, and the workpiece separation are properly coordinated. A schematic representation of such a weld being made is shown in FIG. 1. Each of two workpieces or sheets of parent metal 10, 12 is attached to a filler strip 14 by tack welds 16 and held securely in position by a pair of clamps 13, 15 prior to being completely joined by tungsten inert gas welding apparatus comprised basically of a torch 18 and a gas backup plate 20. In FIG. 1, the torch, shown advancing in a direction 22, is comprised of a circular housing 24 concentrically located about a center electrode 26. An electric arc 28 is established between the tip of electrode 26 and the filler sheet 14 causing the latter to melt and form a weld bead 29. Throughout the weld operation, inert gas, typically argon, is forced down the torch 18 between the housing 24 and the electrode 26 to cover the molten weld bead 29, which has a domed upper surface 30 and a similar domed lower surface 31; the inert gas serves to cool the bead and prevent detrimental oxidation by and absorption of undesired gases from the atmosphere until the temperature of the weld has been reduced sufficiently. Similarly inert gas, typically argon, is fed under pressure into a manifold 32, up through vertical riser holes 34 and into a plenum 36 to provide a gas cover to the back side of the weld seam for the purposes of both cooling and avoiding atmospheric contamination.

The TD nickel being fabricated by the instant welding technique is intended primarily for use in high-temperature gas turbine applications where weight is a prime consideration. Thus the development of the method has been with respect to sheet material having a thickness less than 75 mils. In the butt welding of thick stock (thick stock is considered to be workpieces having a thickness greater than about 25 mils) edge preparation of the workpieces to be joined is preferred; without this preparation, the workpiece corners closest to the electrode 26 become overmelted by excessive heating from the arc resulting overall in an inferior joint. Edge preparation consists of removing both the top and bottom corners of each of the workpieces to be joined (as shown in FIG. 2) and the workpieces are given clean glove handling between preparation and welding in order to reduce contamination in the weld.

Referring to FIG. 2, which shows the assemblage of FIG. 1 before the welding, the workpiece 10 having an upper surface 38, a lower surface 40 and butt edge surface 42 is separated from the workpiece 12 having an upper surface 44, a lower surface 46 and butt edge surface 48, by the filler strip 14 having a width $W_f$. Workpiece preparation is accomplished by removing the corner material along the surfaces 38, 40, 42, 44, 46 and 48, a distance approximately one-third of the thickness $T_w$ of the workpiece to be joined. The configuration shown in FIG. 2 is thick stock immediately prior to welding. The workpieces having a thickness $T_w$ of 40 mils were separated by the filler strip having a width $W_f$ of 50 mils. The width $W_f$ is preferably no less than approximately the thickness $T_w$ of the workpieces being joined. $W_f$ can be made less than $T_w$, however, as $W_f$ is reduced, there is a corresponding increase in difficulty with shrinkage of the weld bead and buckling of the workpieces. Similarly $W_f$ can be increased to more than $T_w$, however, the greater $T_w$ becomes the greater is the width of the final weld bead; since the composition of this bead is different than the parent metal and inferior in strength at very high temperature, $W_f$ should not be allowed to become wider than necessary. The strip 14 is provided with an upward projection $P_u$ above the surfaces 38, 44 of 50 mils and a downward projection $P_d$ below the surfaces 40, 46 of 20 mils. The excess filler strip above and below the workpieces is needed to spread out onto the surfaces 38, 44, 40 and 46 and completely fill the weld gap as is shown in FIG. 3. An insert somewhat similar to the filler strip of the instant invention is used in the welding technique described as Implant Welding in U.S. Pat. No. 3,288,981 issued to M. M. Mabry et al. The implant welding process requires an insert in the weld joint in order to obtain deep penetration and control the depth to width ratio of a weld forming the joining of relatively thick pieces of conventional alloy material. The implant is either of the foil type or the wire type, in either case the implant being relatively small with respect to the thickness of the pieces being welded; without the prescribed insert, the Mabry weld would not occur throughout the thickness of the joint and multiple weld passes are required for a total penetration weld. Mabry does not maintain a minimum spacing between the abutting edges as a means of avoiding buckling. Further, Mabry does not involve the agglomeration of thoria and porosity of the weld seam commonly found in thoria dispersed nickel welds.

In the welding of TD nickel workpieces having a thickness of 40 mils, a filler strip of Aerospace Material Specification 5540, (hereinafter referred to as AMS 5540) comprised of 15.5 percent chromium, 8 percent iron and the remainder nickel, having a width of 50 mils was selected. For the purposes of joining TD nickel in accordance with this invention, the material comprising 15.5 percent chromium, 8 percent iron, 2 percent columbium plus tantalum and the balance nickel (the composition referred to as Inconel 62) can be used in place of AMS 5540. In addition, a filler strip of Aerospace Material Specification 5599 (hereinafter referred to as AMS 5599) comprised of 21.5 percent chromium, 9 percent molybdenum, 3.7 percent columbium and tantalum and the remainder nickel also does form a satisfactory TD nickel weld. Using a tungsten (2 percent thoriated) electrode three thirty-seconds of an inch in diameter, a weld speed of 9 inches per minute was maintained with a current flow of 117 amperes at potential of 9 volts. Argon gas was flowed through the torch at a rate of 30 cubic feet per hour and argon backup gas was passed the backup plate at a rate of 10 cubic feet per hour. Upon completion of the weld, the domed surfaces 30, 31 were ground flat with their respective adjacent surfaces 38, 44 and 40, 46 to facilitate easier working with the now joined workpieces. It should be apparent that having prepared the butt edges 42, 48 prior to welding has resulted in a curved and therefore longer surface of interface between the workpieces 10, 12 and the weld bead 29; thus the edge preparation not only avoided excessive overmelting of the upper edges of the workpieces with concomitant porosity in the weld and agglomeration of the thoria, but it also provided a greater surface for joining between the weld material and the workpieces thereby allowing a joint of higher strength.

In the butt welding of thin stock, (thin stock is considered to be workpieces having a thickness less than about 25 mils) edge preparation of the workpieces to be joined does not produce a correspondingly improved joint as is observed with thick stock. In welding TD nickel having a thickness $T_w$ of 22 mils with a filler strip of AMS 5540 composition having a width $W_f$ of 25 mils, an upward projection $P_u$ of 50 mils and a downward projection $P_d$ of 20 mils, there is an inherent rounding of the corners during the welding process sufficient to result in a weld cross section substantially as is shown in FIG. 3. In selecting a material for the filler strip, it has been found that a solid solution hardened material such as AMS 5540 is preferred. Other types of high-temperature materials will produce a satisfactory weld, for example precipitation hardened alloys such as Waspaloy™, however, not all of the possible filler materials with good welding characteristics are feasible because of subsequent processing which the joined assemblies undergo after the welding operation has been completed. More specifically the precipitation hardened alloy Waspaloy™ has been used and found to provide nonporous joints with sufficient ductility and strength, however, during the subsequent chromium coating of the assembled parts, the weld structure undergoes change during the required 72-hour processing at 2,300° F. After this heat treat the weld is found to have significantly reduced tensile properties. While solid solution hardened alloys having no low-temperature components which would be affected by the chromizing heat process are generally preferred, not all such alloys can be used in welding of TD nickel. Nichrone V, for example, is found to produce satisfactory welds of acceptable porosity and strength and such welds are able to undergo the chromizing process without change, however, the material may be crack prone. Similarly, Haynes 188 will form a satisfactory weld with TD nickel, however, it characteristically has poor high-temperature strength and the material itself is very difficult to form. AMS 5540 is one solid solution hardened alloy which does meet the requirements both of welding and chromizing.

Although the invention has been shown and described with respect to the preferred embodiments thereof, it should be understood by those skilled in the art that the foregoing and other changes and omissions in the form and detail thereof may be made therein without departing from the spirit and scope of the invention.

Having thus described typical embodiments of my invention, that which I claim as new and desire to secure by Letters Patent of the United States is:

1. A method of producing continuous high-quality welds between pieces of thoria dispersed nickel comprising the steps of:
   placing a filler strip between the pieces to be welded, said strip having a width no less than about the thickness of the pieces being joined, and
   welding the pieces and the filler strip together using the tungsten inert gas arc method.

2. The method according to claim 1 wherein said pieces of thoria dispersed nickel consist of thoria dispersed nickel sheet material.

3. The method according to claim 2 wherein said filler strip consists of AMS 5540 material.

4. The method according to claim 2 wherein said filler strip consists of AMS 5599 material.

5. The method according to claim 1 wherein said pieces of thoria dispersed nickel are sheet material having a thickness greater than approximately 25 mils including the steps of:
   preparing the edges of such sheets by removing the corners of said edges to a distance from the welding edge approximately one-third of the thickness of the sheets being welded,
   setting said prepared sheets in juxtaposition with a filler strip having a width no less than about the thickness of the sheets being joined, said filler strip projecting substantially above and below the sheets to be joined, and
   passing the assembly so formed through a tungsten inert gas arc welding apparatus.

6. The method according to claim 5 wherein said filler strip projects substantially above the plane of the upper surfaces of the sheets to be joined by approximately 50 mils and below the plane of the lower surfaces of the sheets to be joined a distance of approximately 20 mils.

7. The method according to claim 6 wherein said filler strip consists of AMS 5540 material.

8. The method according to claim 6 wherein said filler strip consists of AMS 5599 material.

9. The method according to claim 1 wherein said thoria dispersed nickel pieces consist of sheet material having a thickness less than approximately 25 mils, including the steps of:

placing said filler strip between the pieces to be welded, the filler strip having a width no less than about the thickness of the pieces about to be welded, said filler strip projecting substantially above the plane of the surface of the pieces to be welded and below the plane of the lower surface of the pieces to be welded, and passing the assembly so formed through a tungsten inert gas arc welding apparatus to weld the pieces and filler strip together.

10. The method according to claim 9 wherein said filler strip projects above the plane of the upper surface of the pieces to be joined approximately 50 mils and below the plane of the lower surface of the sheets to be joined approximately 20 mils.

11. The method according to claim 10 wherein said filler strip consists of AMS 5540 material.

12. The method according to claim 10 wherein said filler strip consists of AMS 5599 material.

* * * * *